United States Patent [19]
Barnabei et al.

[11] Patent Number: 5,185,224
[45] Date of Patent: Feb. 9, 1993

[54] SOLID INTERSPERSED EXPANDED COLLECTOR GRID

[75] Inventors: Robert A. Barnabei, Harleysville; James R. Picozzi, Hatfield, both of Pa.

[73] Assignee: Alliant Techsystems Inc., Edina, Minn.

[21] Appl. No.: 631,170

[22] Filed: Dec. 20, 1990

[51] Int. Cl.⁵ .............................. H01M 4/58
[52] U.S. Cl. ............................. 429/218; 429/242
[58] Field of Search ............ 429/218, 233, 242, 234, 429/241, 211

[56] References Cited

U.S. PATENT DOCUMENTS

| | | | |
|---|---|---|---|
| 3,099,899 | 8/1963 | Hagen et al. | 429/242 |
| 3,953,232 | 4/1976 | Roth et al. | 429/218 |
| 4,136,234 | 1/1979 | Fritts | 429/218 |
| 4,259,420 | 3/1981 | Feiman et al. | 429/218 |
| 4,284,693 | 8/1981 | McDowell | 429/242 |
| 4,324,847 | 4/1982 | Athearn | 429/218 |
| 4,430,397 | 2/1984 | Untereker | 429/191 |
| 4,535,040 | 8/1985 | Kline | 429/242 |
| 4,865,928 | 9/1989 | Richter | 429/241 |

Primary Examiner—Mark L. Bell
Assistant Examiner—Deborah Jones
Attorney, Agent, or Firm—Haugen and Nikolai

[57] ABSTRACT

An improved, expanded metal grid anode current collector is provided for supporting the active metal of the anode in a high energy density, non-aqueous active metal electrochemical cell in which the anode substrate is fabricated from expanded stainless steel or nickel having interspersed expanded metal and solid segments such that the leads can be attached to the solid metal segments.

9 Claims, 2 Drawing Sheets

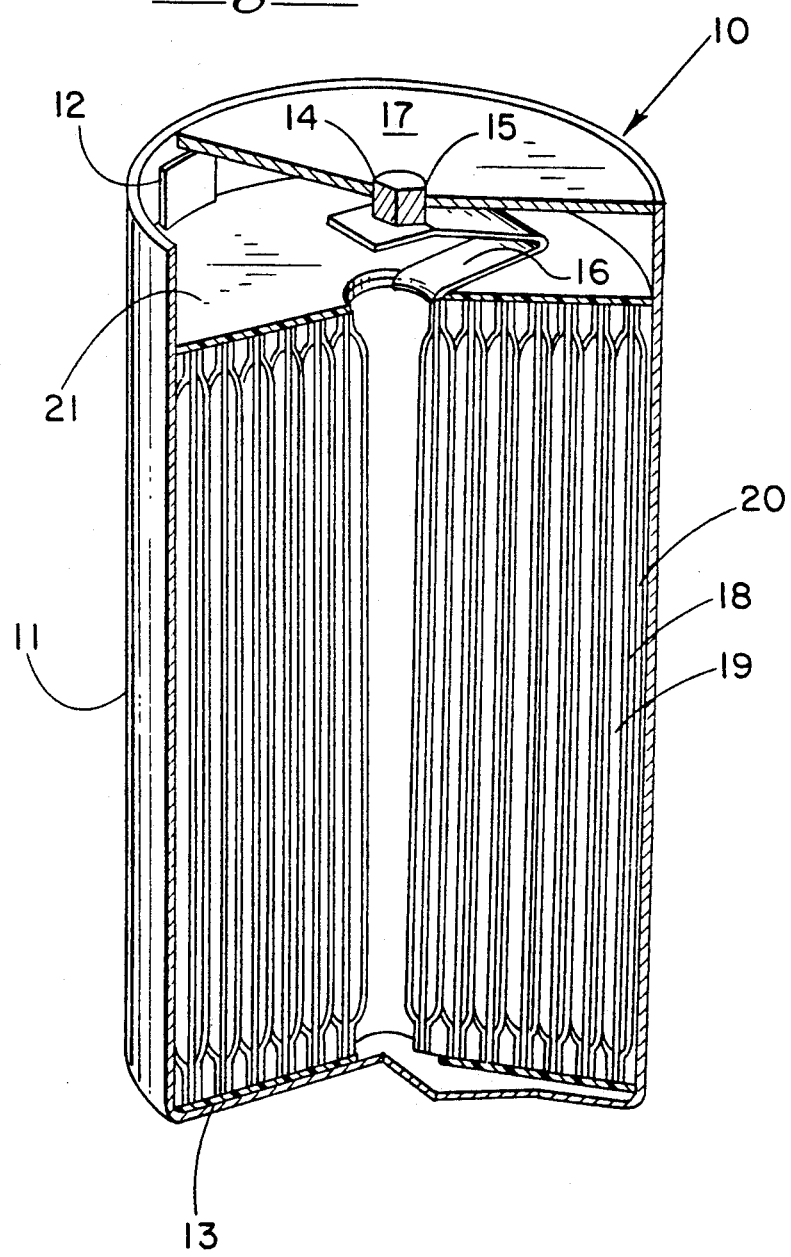

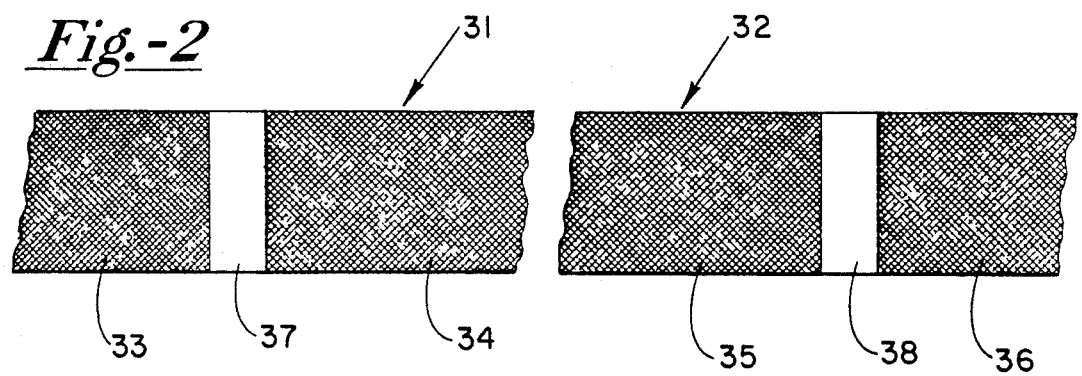
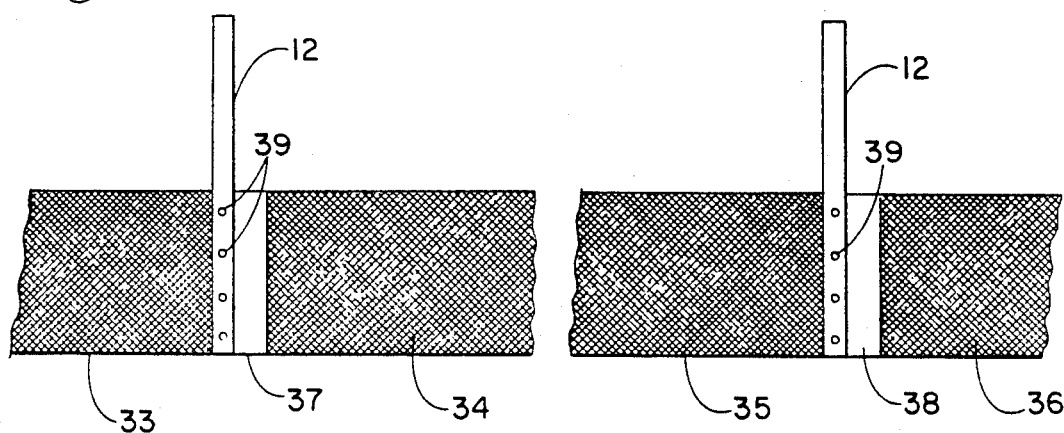
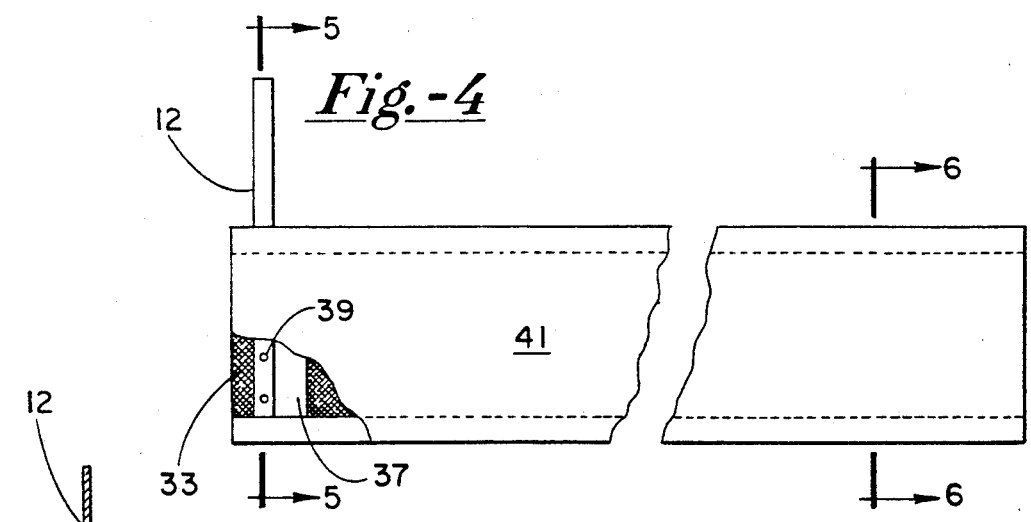
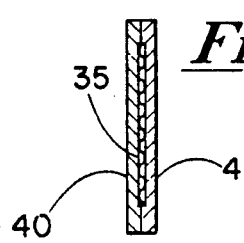

SOLID INTERSPERSED EXPANDED COLLECTOR GRID

BACKGROUND OF THE INVENTION

I. Field of the Invention

The present invention is directed generally to the field of high energy density, non-aqueous active metal electrochemical cells and, more particularly, to an unique interspersed expanded metal collector grid for use as an anode substrate in support of the active metal of the anode for such a cell to improve reliability and facilitate manufacture.

II. Description of the Related Art

Active metal cells of the class described, typically consist of a light, strongly reducing active anode material, normally an alkali metal such as lithium, an aprotic, non-aqueous solvent depolarizer such as thionyl chloride or sulfur dioxide into which an appropriate quantity of a salt of the anode metal such as $LiA_5F_6$ or $LiBF_4$ has been dissolved to form a conductive solution, and an oxidizing agent as the cathode active material.

In some applications, the cells are assembled as deferred action or reserve cells in which the electrolyte system is typically stored separated from one or both electrodes contained in a readily rupturable container such as a glass ampule such that the cells remain in an inactive state until such time as the cell is activated. Activation is normally accomplished by applying an external force in a predetermined manner to rupture the glass ampule thereby allowing rapid dispersal of the electrolyte system to complete the electrochemical continuity between anode and cathode. In other applications, the cells are manufactured and assembled in the active state in which the electrolyte system is supplied at the time of assembly giving the cell complete electrochemical continuity from the beginning. Some active cell configurations may also be rechargeable with respect to redepositing the active metal of the anode after discharge or partial discharge of the cell in a cyclical manner.

Generally, all of the above-mentioned types of cell applications have substantially common fundamental construction with respect to anode, cathode and separator. In one configuration, the active metal anode material is carried by an anode current collector support member in the form of a stainless steel or nickel expanded metal or wire mesh. Thin layers of the anode active material are applied over one or both faces of the gridwork and pressed firmly into the grid by a laminating roller. A layer of separator material, which may be paper or ceramic, is disposed between the anode support member carrying the anode active material and a cathode collector member, usually nickel, which carries the cathode active material, usually carbon or acetylene black. Teflon or other such binder material may be used to help adhere the carbon black to the cathode collector member.

The anode support member carries the anode lead which is normally a solid conductor member. In the past, these leads have been attached to the expanded metal of its collector member by welding the expanded metal grid to the solid lead. This prior technique was not reliable enough with respect to achieving uniform weld strengths and it was "hit and miss" as to whether any particular welded lead was properly attached.

In addition, the welding of the lead to the expended metal often resulted in an undesirable amount of metal build-up in the vicinity of the lead attachment. This produced further problems with the laminating process because of the increased unevenness or nonuniformity of the thickness of grid support layer in the area of the lead attachment. In certain cases, the build-up has been enough such that when the layers including the separator barrier and the composite cathode are assembled with the anode into a thin composite, electrode shorting could occur in the finished product.

SUMMARY OF THE INVENTION

In accordance with the present invention, problems associated with lack of physical strength in welding anode leads to expanded metal anode supporting current collectors, together with problems in laminating the active anode materials with the expanded metal grid in light of these attached welded leads, are solved. The invention provides an unique anode support configuration which takes advantage of characteristics associated both with the open grid of the expanded metal and the ease and reliability of welding between two continuous surfaces.

The anode supporting collector of the invention is preferably made in a continuous web or ribbon form having predetermined lengths of elongated expanded metal or open grid segments separated by rather shorter unexpanded segments of solid metal material. The leads are relatively long, thin solid metal strips and are fixed to the shorter solid segments disposed generally with the longer strip dimension at right angles to the long dimension of the continuous ribbon. They may be attached by a plurality of spot welds, seam or sonic welding. The continuous ribbon with the anodes attached can be manufactured as a continuous roll designed to be cut to length for the fabrication of a plurality of individual composite laminated anodes.

The composite laminated anodes are constructed from a pair of thin strips or ribbons of anode active material, normally lithium foil laminated flanking the outside of the expanded metal anode lead and grid assembly. The two strips of lithium are somewhat wider than the expanded metal grid so that the two strips of lithium when compressed on opposite sides of the expanded metal and lead, envelop the assembly except for the anode lead which protrudes from each composite laminate anode assembly. In accordance with the invention, the composite can be as thin as about 0.007 inches in the expanded metal portion and somewhat thicker in the area of lead attachment where a double metal thickness occurs.

Anode assemblies fabricated in accordance with the invention exhibit greatly improved lead attachment quality and consistency. Welding of the solid leads eliminates the buildup of weld metal and reduces the overall thickness of the assembly in the lead attachment areas. The composite can be formed into any desired shape once the laminar layers have been applied. The solid portion of the interspersed expanded metal collector grid with lead also provides a location on which the pressure of a laminating roller can be first applied and adjusted prior to application on the expanded metal portion.

BRIEF DESCRIPTION OF THE DRAWINGS

In the drawings:

FIG. 1 is a vertical perspective view with parts cut away of a cell of a class in which the anode assembly of the present invention may be used;

FIG. 2 is a fragmentary view of a continuous interspersed expanded collector grid web in accordance with the invention;

FIG. 3 is the interspersed expanded collector grid of FIG. 2 with leads attached to the solid segments;

FIG. 4 is a laminated anode assembly cut to length for use in a cell;

FIG. 5 is an elevational sectional view taken substantially along lines 5—5 of FIG. 4, including the lead; and FIG. 6 is a view taken along lines 6—6 of FIG. 4.

DETAILED DESCRIPTION

Most of the improvements in the art related to active metal, non-aqueous electrochemical cells of the class described have generally dealt with improvements to the electrolyte systems or in the cathode materials. In these electrochemical couples or known cell embodiments, lithium or other typical low density, strongly reducing metals or alloys of lithium are utilized. However, the lithium or other active metal of the anode together with the substrate or other member supporting the lithium metal, if such is used, have generally not been the subject of such improvements. The present invention deals with an improvement in the anode and supporting structure for such a cell which renders it more suitable for uniform manufacture and provides an improved lead connection to the active metal collector support system suitable for many applications.

FIG. 1 illustrates a perspective view with parts cut away of a typical cell of a class for which the present anode system has been designed. The cell is shown generally at 10 and includes a generally cylindrical stainless steel, cold formed outer shell or case member 11 which itself may be negatively charged by virtue of being in intimate contact with one or more nickel anode leads 12. The electrochemical system is separated from the bottom of the cell by an insulator member 13, which may be a polyethylene disc or other relatively inert non-conducting member. A glass insulator 14 separates the cathode feedthrough 15 connected to a lead 16 from the cathode current collector. The cathode feedthrough 15 is normally made of molybdenum. With respect to cell construction, there is further provided a second or upper polyethylene insulator 21 which is generally shaped as a disk. The coefficient of expansion of the glass seal 14 is coordinated to be compatible with that of the header plate 17 and the feedthrough terminal 15 such that an hermetic seal is maintained over a fairly wide temperature range.

The electrochemical system is shown including a composite lithium anode system 20, a composite cathode system 18 and a 15 separator 19 sandwiched therebetween. These are aligned together and the entire system is wound about in the form of a continuous coil within the cell case 11 to maximize electrode area. Cell output is increased by adjusting the anode area/volume ratio so that a relatively thin layer of large area is available to produce high level instantaneous energy output, if desired. The anode material, of course, is separated from the cathode by the continuous vertical separator 19 which may be of paper or matted glass fiber or a porous ceramic material but which must be capable of allowing permeation by the electrolyte and prevent direct anode/cathode contact. Although not illustrated in detail, the cathode system may be quite conventional and includes a layer of cathode composition mix and a metal cathode current collector substrate. The material of the cathode mix may be, for example, approximately 85% acetylene black (100% compressed) and approximately 15% finely divided PTFE binder which produces a good mix capable of readily adhering to the substrate and providing sufficient path to the cathode current collector substrate which is normally of stainless steel, nickel or aluminum.

The anode assembly of the invention includes the use of an expanded metal type collector grid in which sections of expanded metal are joined have solid metal sections interspersed in between. The grid material is illustrated by FIG. 2, which depicts two fragments 31 and 32 of a continuous web or ribbon of material having expanded metal sections or segments 33, 34, 35 and 36 with interspersed solid metal segments 37 and 38 therebetween. FIG. 3 depicts the web fragments of FIG. 2, with electrode leads 12 attached to the solid portions of the continuous web or ribbon as by spot welds at 39. The electrode leads 12 are disposed substantially perpendicular to the ribbon segments and protrude beyond the ribbon for ease of connection to a cell case or anode pin feedthrough, as the case may be, in a well known manner.

FIGS. 4–6 depict the anode assembly of a typical anode after application of the thin layers of active metal foil surrounding the expanded metal collector grid 33, 34, 35 and 36, the collector grid is enveloped in the active metal foil with only the conducting lead protruding. Care must be taken in pressing the foil layers into the grid so that a uniform thin composite can be produced.

By spot welding the leads 12 into the solid segments as at 37 and 38, no additional layers of material are added and so the thickness can be maintained at a minimum. The continuous ribbon of anode composite can be cut to length, including an amount of electrode material and a lead and assembled into, for example, a C- or D-sized cell wound together with a length of cathode composite and separator.

The non-aqueous electrolyte is added to the assembled cell. The electrolyte system is normally a solution of a lithium salt contained with an amount of $SO_2$ solvent depolarizer in a liquid electrolyte system.

The invention has been described herein in considerable detail in order to comply with the Patent Statutes and to provide those skilled in the art with the information needed to apply the novel principles and to construct and use such specialized components as are required. However, it to be understood that the invention can be carried out using specifically different materials, equipment and devices and that various modifications can be accomplished without departing from the scope of the invention itself.

What is claimed is:

1. A thin composite anode system for use in high discharge rate, non-aqueous active metal electrochemical cells comprising:

a thin continuous one-piece section forming a central metal current collector grid member having at least one major area of expanded metal and at least one integral minor area of solid unexpanded metal;

an electrode lead fixed to one such integral minor area of solid metal; and an amount of an active metal anode material pressed into the opposite surfaces of the expanded metal of the collector grid member.

2. The composite anode structure of claim 1 wherein the active metal anode material is lithium or a lithium alloy.

3. The composite anode structure of claim 1 wherein the metal of the current collector gird and electrode lead is selected from stainless steel and nickel and the active metal anode material is lithium.

4. The composite anode structure of claim 1 wherein the current collector gird member is manufactured as a continuous laminated web having a series of spaced relatively narrow solid segments with leads attached separated by interspersed relatively wide expanded collector grid segments sized such that the web can be cut to length to product a plurality of anodes.

5. The composite anode structure of claim 1 wherein the lead is spot welded to the collector member.

6. The composite anode structure of claim 3 wherein the lead is spot welded to the collector member.

7. The composite anode structure of claim 4 wherein the lead is spot welded to the collector member.

8. A non-aqueous high rate active metal electrochemical cell comprising:
   a composite anode system comprising a one-piece section forming a continuous central current collector grid member containing at least one relatively wide segment of expanded metal and at lest one integral relatively narrow segment of solid unexpanded metal, a metallic conducting electrode lead connected to one such integral relatively narrow area of solid unexpanded metal and an amount of the active metal anode material pressed onto the opposite surfaces of the expanded metal segment of the grid member;
   a cathode, juxtaposed the anode;
   a separator between the anode and cathode;
   a non-aqueous electrolyte system providing electrochemical linkage between the anode and the cathode.

9. The electrochemical cell of claim 8 wherein the anode separator and cathode are wound in a concentric helical configuration.

* * * * *